United States Patent

Blitz et al.

[11] Patent Number: 5,128,778
[45] Date of Patent: Jul. 7, 1992

[54] FAST SCAN IMAGING AREA OPTIMIZATION SYSTEM

[75] Inventors: William A. Blitz, Webster; James E. Summers, Fairport, both of N.Y.

[73] Assignee: Xerox Corporation, Stamford, Conn.

[21] Appl. No.: 589,947

[22] Filed: Sep. 28, 1990

[51] Int. Cl.$^5$ ............................................. H04N 1/04
[52] U.S. Cl. .................................... 358/482; 358/406; 358/213.13; 358/445
[58] Field of Search .......... 358/461, 464, 451, 482, 358/483, 213.13, 213.15, 213.16, 213.17, 213.18, 213.19, 406, 445; 250/235, 208.1, 236

[56] References Cited

U.S. PATENT DOCUMENTS

| | | |
|---|---|---|
| 4,464,681 | 8/1984 | Jacobs et al. .................. 358/406 |
| 4,567,529 | 1/1986 | Yamaguchi et al. ............ 358/294 |
| 4,580,172 | 4/1986 | Rajogopal ....................... 358/293 |
| 4,663,656 | 5/1987 | Elabd et al. ..................... 358/75 |
| 4,709,147 | 11/1987 | Arai ................................. 250/234 |
| 4,734,772 | 3/1988 | Akiyama ...................... 358/213.13 |
| 4,974,098 | 11/1990 | Miyakawa et al. .............. 358/406 |

*Primary Examiner*—Jin F. Ng
*Assistant Examiner*—Dov Popovici
*Attorney, Agent, or Firm*—Frederick E. McMullen

[57] ABSTRACT

An electronic printing system in which undefined photosites at the ends of a linear scanning array are temporarily enabled to thereby increase the width of the scan line when scanning oversized or misaligned documents provided that the unused photosites are calibrated.

2 Claims, 6 Drawing Sheets

FAST SCAN IMAGING AREA OPTIMIZATION SYSTEM

The invention relates to scanners for use with electronic printing systems, and more partiuclarly to a system enabling the fast scan imaging area to be temporarily increased in size to prevent loss of image data when scanning oversized or misaligned documents.

Electronic printing systems employ image signals or pixels as the source of images for making prints. Typically, the image signals are derived by scanning hard copy documents using a scanning array such as a CCD which converts the document images scanned to electrical signals. Following the scan, the electrical signals, which are analog in form, are processed to enhance the quality of the image printed and to convert the image signals to digital signals for use by the system printer in making prints.

As will be appreciated, scanners are necessarily designed to scan documents up to a predesigned maximum width. This enables the desired image scanning resolution to be assured since the width of the scan line and the number of photosites available for scanning the scan line are fixed to plus and minus tolerances. However, where a part of the document image is outside the scanned area, as for example where the width of the document is such that a part of the document extends beyond the end or ends of the scan line or where the document is not properly aligned on the platen so that part of the document projects past the end of the scan line, those parts of the document image are not scanned and therefore lost. While situations of the type referred to can be negated by the operator making sure that the size of the document being scanned is within the scanner limits and that the document is properly aligned on the platen, this is not always practical. The operator, in order to obtain copies, may be forced to proceed, even though the operator suspects that there may be a problem and that some of the document images will NOT BE CAPTURED. Actually, the operator may not learn that an image loss has occurred until a substantial number or even all of the documents have been scanned and prints made. At that point, in order to recover the missing images, the affected documents must be rescanned again, with special handling to assure that the entire document image is canned. This is obviously wasteful and uneconomical, and is a nuisance to the operator.

In the prior art, U.S. Pat. No. 4,709,147 to Arai discloses an image reading apparatus in which the scan line is registered to a reference point on a reference plate that is scanned by the array first. U.S. Pat. No. 4,580,172 to Rajogopal discloses an optical scanning system for a document copier having wide and narrow fields of view obtained by shifting a lens assembly composed of lens and CCD array. And U.S. Pat. No. 4,567,529 to Yamaguchi et al discloses a self-scanning image sensor which uses a switch to selectively turn on and off charging currents fed to elements of a phototransistor type array, while U.S. Pat. No. 4,663,656 to Elabd et al discloses a repeated pattern high resolution CCD imager with successive rows of abutting CCD arrays to form an expanded optical scanning width.

In contrast, the present invention provides a document scanner, comprising in combination: at least one scanning array having at least one linear row of photosites for scanning a document line of preset width, the photosites including a first group of photosites comprising substantially all of the photosites for scanning the document line with at least one second group of the photosites at one or both ends of the array that are not normally used for scanning; and control means for selectively actuating the second group of photosites to temporarily increase the width of the scan line to accommodate oversized or misaligned documents.

IN THE DRAWINGS

Figure 1:
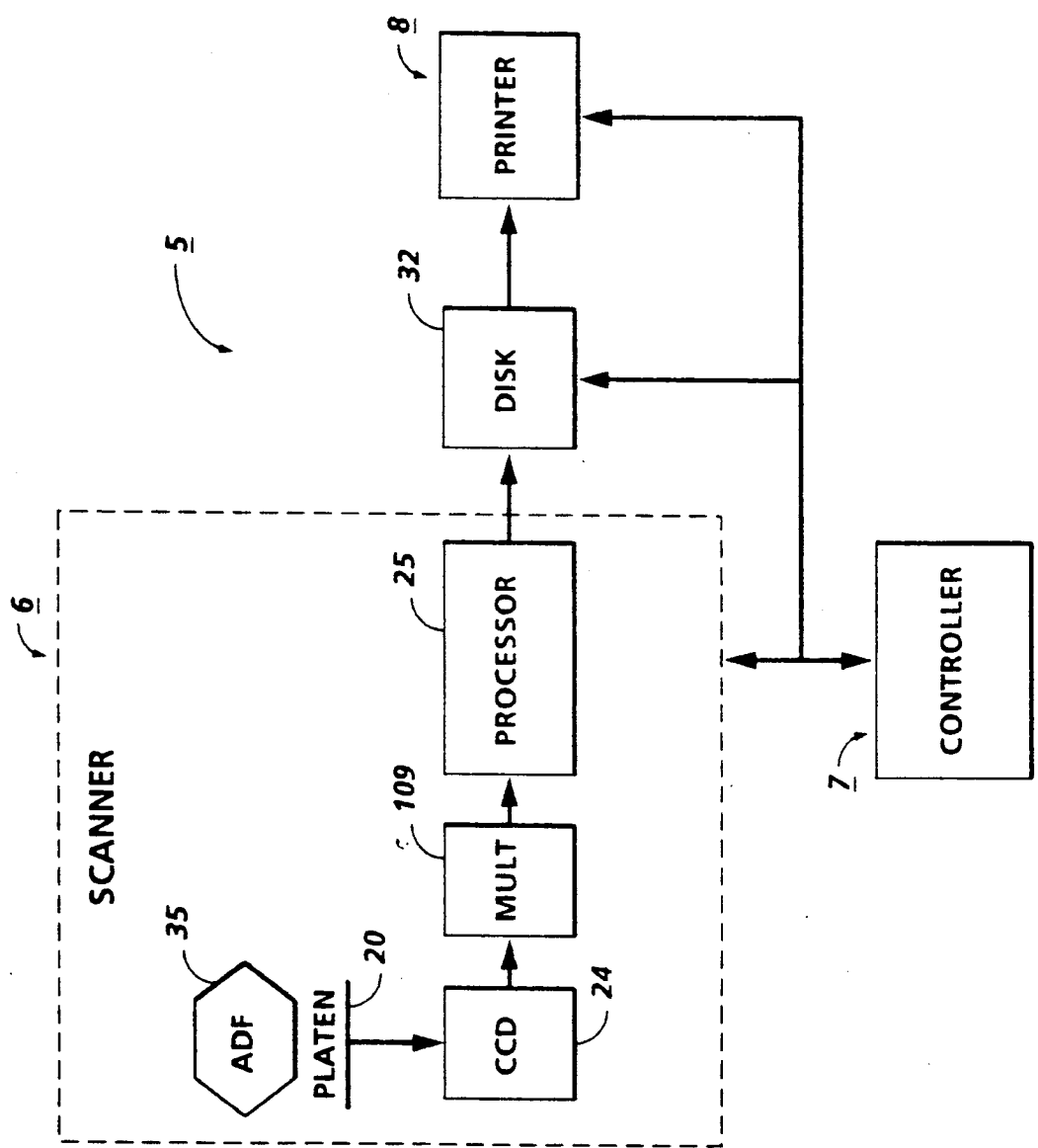
FIG. 1 is a view of an electronic printing system with document scanner incorporating the fast scan imaging area size increasing system of the present invention.
Figure 2:
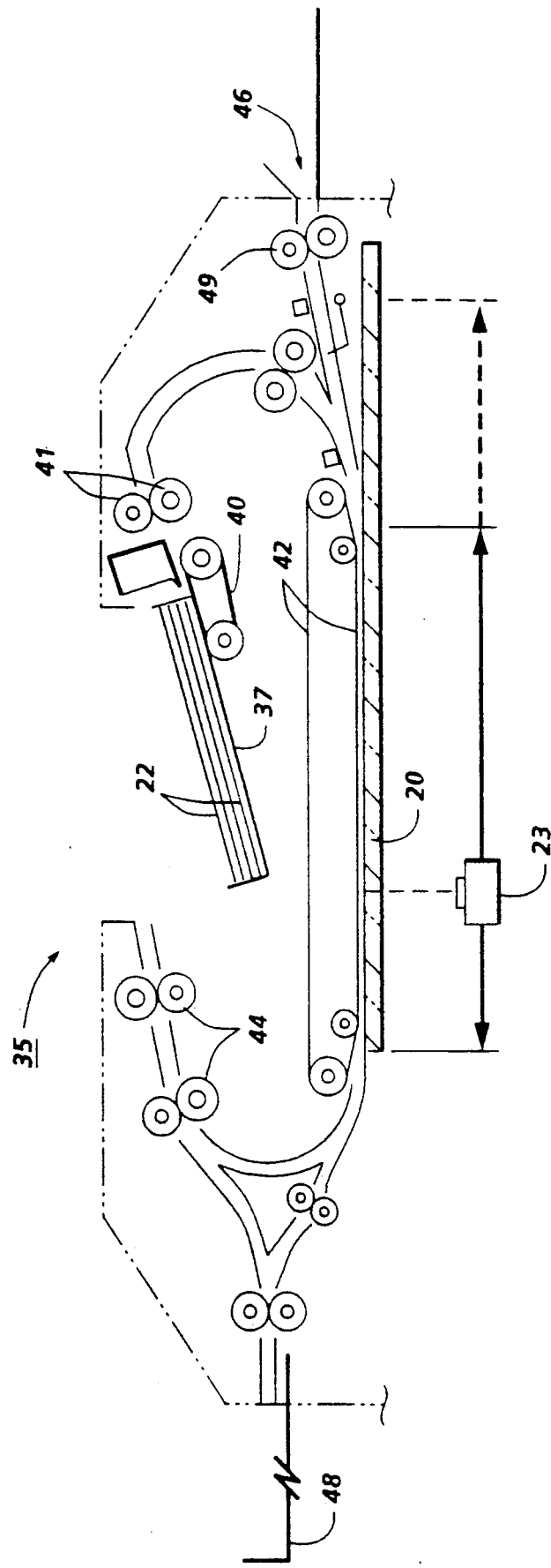
FIG. 2 is an enlarged view showing details of the automatic document handler (ADF)
Figure 3:
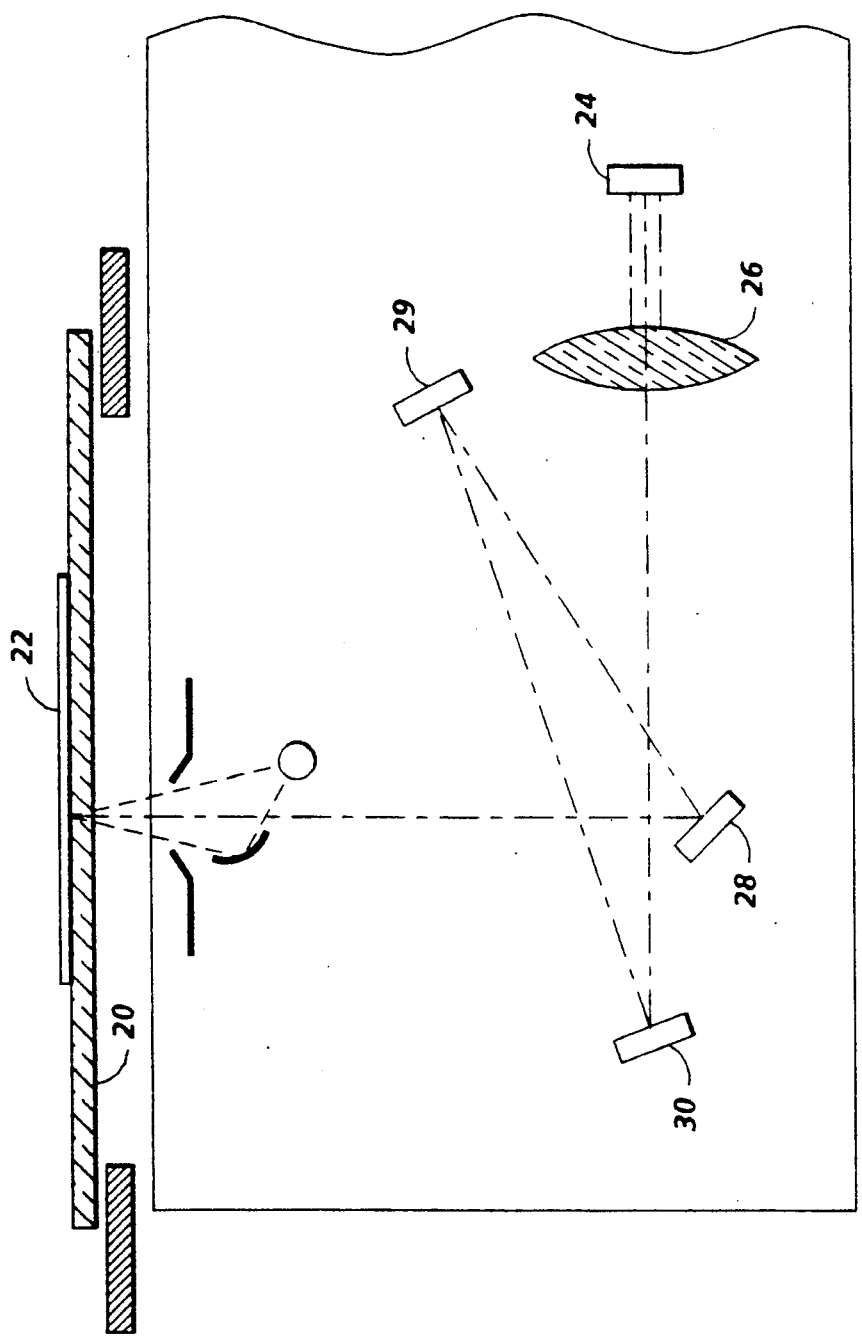
FIG. 3 is a schematic view showing details of the document scanner optical system.

Referring to FIGS. 1-3, there is shown a document scanner, identified generally by the numeral 6, of the type adapted for use with an electronic printing system 5 having a printer 8 for producing prints in response to image signals or pixels. Controller 7 controls the various operating components of printing system 5 including scanner 6 and printer 8. Scanner 6, as will appear, serves to scan image bearing documents 22 and convert the image content to image signals for making prints of the documents scanned.

Scanner 6 has a transparent platen 20 on which individual documents 22 to be scanned are located. One or more linear arrays 24 together with lens 26 and mirrors 28, 29, 30 are supported on a carriage 23 for reciprocating scanning movement in the slow scan direction below platen 20. Lens 26 and mirrors 28, 29, 30 cooperate to focus array 24 on a line-like segment (herein scan line 120 seen in FIG. 5) of platen 20 and the document resting thereon. Array 24 scans in the fast scan direction to provide image signals or pixels representative of the image scanned to a suitable processor 25. Processor 25 converts the analog image signals output by array 24 to digital for use in making prints. Processor 25 may also provide enhancements and changes to the image signals such as filtering, thresholding, screening, cropping, scaling, etc. The image signals output by processor 25 are stored on one or more disks 32 pending use by printer 34.

In scanner 6, documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Figure 4:
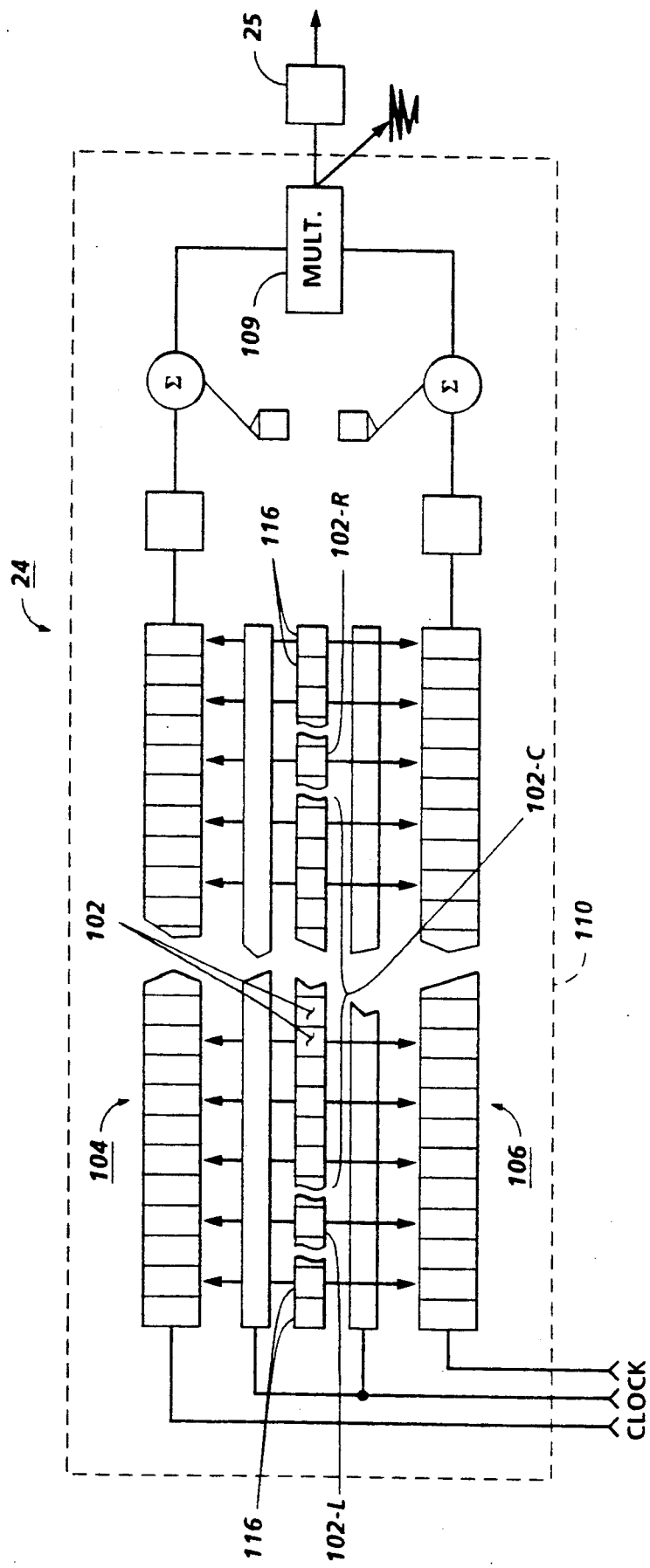
FIG. 4 is a schematic view showing details of the scanning array.

Referring to FIG. 4, array 24 has a plurality of photosensitive elements or photosites 102 arranged in a row together with suitable operating and timing circuits such as shift registers 104, 106 integrated on a silicon chip or substrate 130. A typical commercially available array 24 has approximately 6000 photosites 102. Typically, there are a number of photosites 116 at each end of the array which are undefined and therefore not guaranteed by the chip manufacturer as being suitable for use. While photosites 116 may function and if used provide a signal representative of the image area viewed by the photosites, the accuracy of the image signal generated may be doubtful. Because of this, only the defined photosites 102 are used for scanning purposes with use of any undefined photosites 116 at one or both ends of the array avoided.

Normally a number or block of the defined photosites 102 adjacent one or both ends of the array (designated by numerals 102-L and 102-R) are not used for scanning documents but are instead reserved of other scan related activities such as calibrating scanner 6, diagnostics, servicing, etc. The remaining or core group of defined photosites (designed by numeral 102-C) and which constitute the bulk of the photosites, are used for scanning.

The analog signals of the individual photosites 102, representing the gray level of the minute image areas viewed by the defined photosites 102, are transferred to shift register 104, 106, shift register 104 receiving signals from the even numbered photosites 102, which shift register 106 receives signals from the odd numbered photosites. The analog image signals are thereafter clocked out of shift registers 104, 106 in alternating fashion to multiplexer 19 which provides a serial stream of image signals to processor 25. The image signals from the blocks of photosites 102-L and 102-R, which are used for calibration purposes, are also input to processor 25 for this purpose.

Figure 5:
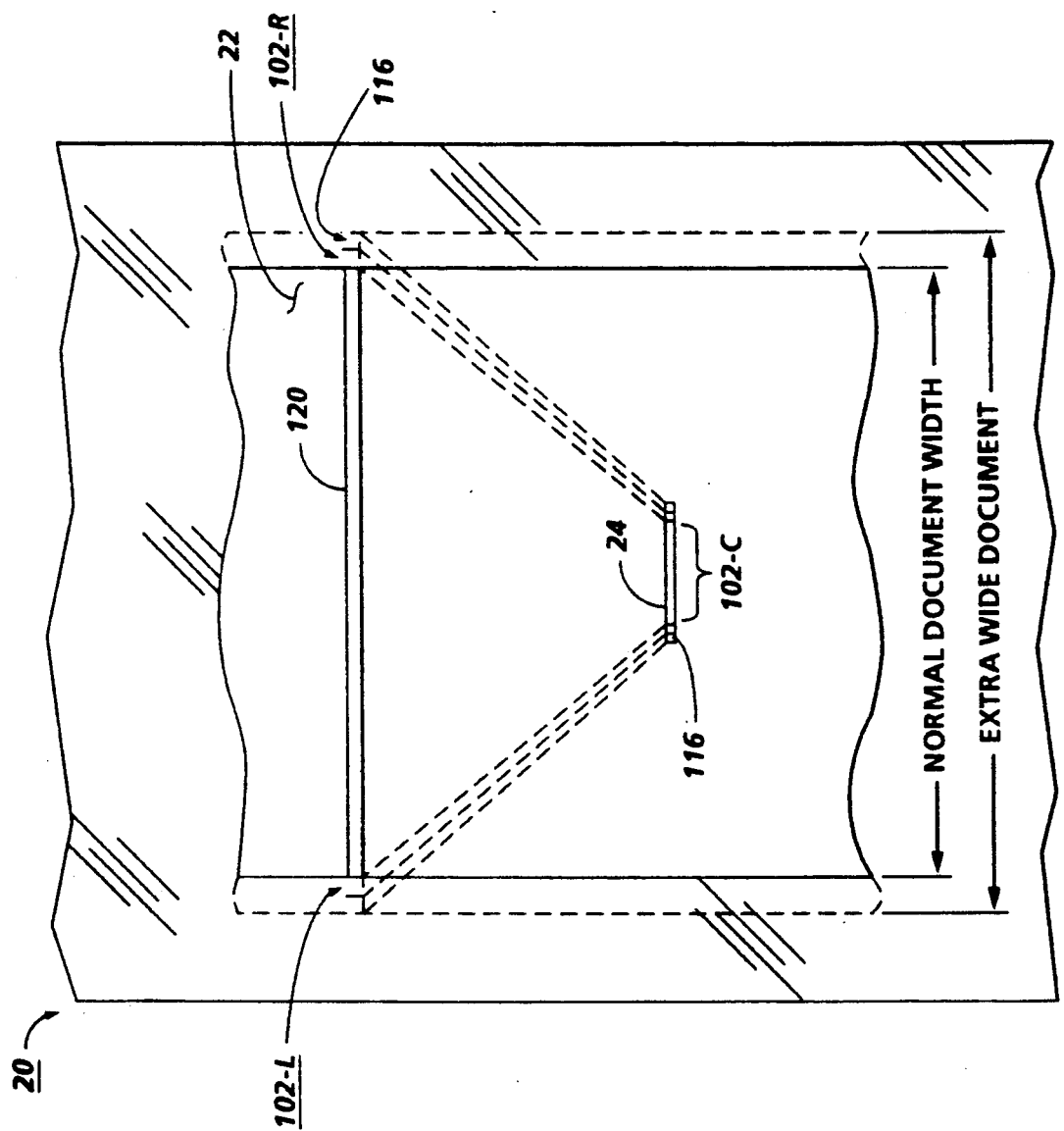
FIG. 5 is a plane view of the scanner platen depicting the relation between the array scan line and conventional sized and oversized documents.

Referring also to FIG. 5, the core group of photosites 102-C scan a line 120 of preset length (i.e., 14.33"). The blocks of photosites 102-L and 102-R view image areas on either side of scan line 120. Any undefined photosites 116 view image areas next to the image areas viewed by photosite blocks 102-L and 102-R as will be understood.

Prior to scanning, the core photosites 102-C of array 24 are calibrated in order to assure accuracy. Photosites 102 are typically calibrated for offset and gain, the resulting calibration parameters obtained being used to compensate for differences (i.e., offsets) between the photosites 102 and to compensate for different sensitivities (i.e., gain) of the photosites as will be understood.

The blocks of photosites 102-L and 102-R, which are not used for scanning, are also calibrated and, in accordance with the present invention, so are any undefined photosites 116 at either end of the array 24 as will appear.

In the scanning operation, so long as the width of the document 22 being scanned is equal to or less than the width of scan line 120 and so long as the document is located or registered on platen 20 so as to be within the confines of scan line 120, the entire document image is captured during scanning. Where however the width of the document is greater than the width of scan line 120 or the document is shifted slightly to one side of the other when placed on platen 20, the portion of the document image along the edge or edges of the document that extend beyond scan line 120 are missed.

Figure 6:
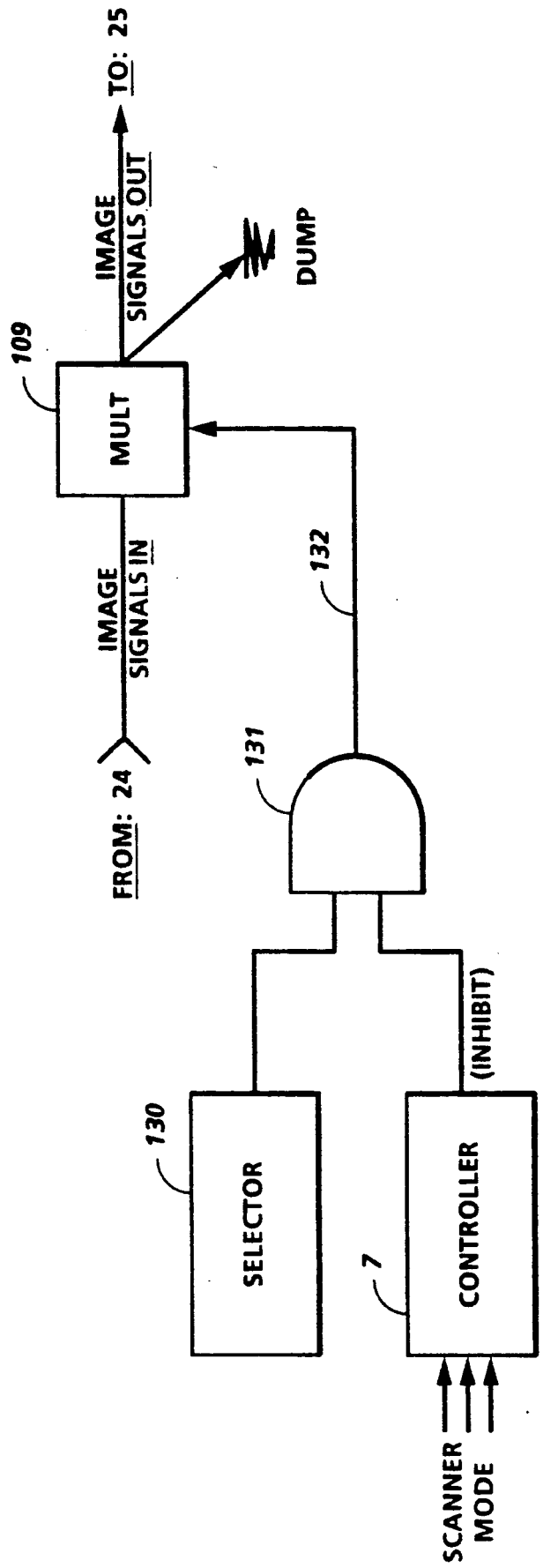
FIG. 6 is a control schematic showing the control elements for increasing the fast scan imaging area of the present invention.

Referring to FIG. 6, to avoid this, an extra long scan selector 130 is provided on the scanner console (not shown) for use by the operator when extra wide documents are being scanned or in cases where it is expected that the documents being handled by scanner 6 will be shifted slightly to one side or the other during feeding of the documents into scanning position on platen 20. The outputs of controller 7 and of selector 130 are coupled through gate 131 and control line 132 to multiplexer 109.

Selector 130, when actuated, programs scanner 6 for an extra wide scan by setting multiplexer 109 so that the signals output by the blocks of photosites 102-L and 102-R at each end of scanning array 24, which are normally only used for calibration purposes, together with any undefined photosites 116 are also used to scan the document. As a result, the length of scan line 120 is effectively increased to capture a slightly wider image than normal. In this case, the image signals output to processor 25 are derived from the core block of photosites 102-C, the blocks of photosites 102-L and 102-R at each end of the array, and by any undefined photosites 116 that are used are input to processor 25.

To assure the accuracy of the image signals output by any undefined photosites 116 used, use of the image signal output from the undefined photosites is precluded by controller 7 where the photosites have not been calibrated.

While undefined photosites 116 are shown and described at both ends of array 24, it will be understood that undefined photosites may be at only one end of the array. And while blocks of calibrating photosites are shown and described both ends of the array, it will further be understood that photosites for calibration purposes may be reversed at one end only of the array. Alternately, calibration photosites may be omitted or non-dedicated photosites used for calibration purposes.

While the invention has been described with reference to the structure disclosed, it is not confined to the details set forth, but is intended to cover such modifications or changes as may come within the scope of the following claims.

We claim:

1. In a document scanner, the combination of:
   a) at least one scanning array having at least one linear row of photosites for scanning a document line of preset width,
   b) said photosites including a first group of photosites comprising substantially all of said photosites for scanning said document line with at least one second group of said photosites at one or both ends of said array that are not normally used for scanning;
   c) selector means for selectively actuating said second group of photosites to temporarily increase the width of a scan line to accommodate oversized or misaligned documents;

d) means for calibrating said photosites before scanning said document line;

e) said second group of photosites including uncalibrated photosites; and f) control means adapted to override said selector means and prevent actuation of said uncalibrated photosites actuated by said selector means.

2. In an electronic printing system having a printer for producing prints from image signals and a scanner for scanning documents and converting images on said documents to image signals for use by said printer in producing prints, said scanner having a platen for supporting documents for scanning, the combination of:

a) at least one linear array of photosensitive elements movable relative to said platen for scanning documents on said platen, said array except for a relatively small number of unused photosensitive elements at each end of said array providing a scan line of predetermined width for scanning documents on said platen line by line;

b) means to temporarily enable said unused photosensitive elements to scan said platen and the document thereon whereby to increase the width of said scan line;

c) means to calibrate said photosensitive elements providing said scan line and at least some of said unused photosensitive elements whereby to provide both calibrated and uncalibrated unused photosensitive elements; and d) means to prevent use of said uncalibrated unused photosensitive elements.

* * * * *